United States Patent [19]

Hori

[11] Patent Number: 4,864,893

[45] Date of Patent: Sep. 12, 1989

[54] PLANETARY GEAR HAVING ITS ORBITAL GEARS OUT OF PHASE

[75] Inventor: Kouhei Hori, Chigasaki, Japan

[73] Assignee: Kabushiki Kaisha Toshiba, Kawasaki, Japan

[21] Appl. No.: 78,631

[22] Filed: Jul. 28, 1987

[30] Foreign Application Priority Data

Jul. 28, 1986 [JP] Japan .............................. 61-177008

[51] Int. Cl.$^4$ ............................................. F16H 57/10
[52] U.S. Cl. ....................................... 74/788; 74/460; 74/801
[58] Field of Search ................. 74/460, 462, 785, 788, 74/797, 801

[56] References Cited

U.S. PATENT DOCUMENTS

| | | | |
|---|---|---|---|
| 2,222,814 | 11/1940 | Hodges | 74/301 |
| 2,845,809 | 8/1958 | Hetzel | 74/440 |
| 3,792,629 | 2/1974 | Applebury | 74/801 |
| 4,040,312 | 8/1977 | Tappan et al. | 74/801 |
| 4,043,226 | 8/1977 | Buuck | 74/801 |
| 4,106,360 | 8/1978 | Manna | 74/440 |
| 4,116,293 | 9/1978 | Fukui | 74/801 X |
| 4,280,376 | 7/1981 | Rosen | 74/801 X |
| 4,366,727 | 1/1983 | Jonsson | 74/801 |
| 4,679,459 | 7/1987 | F'Geppert | 74/462 X |

FOREIGN PATENT DOCUMENTS

| | | | |
|---|---|---|---|
| 0178620 | 4/1986 | European Pat. Off. | |
| 3305151 | 8/1984 | Fed. Rep. of Germany | 74/801 |
| 373710 | 5/1907 | France | 74/801 |
| 1257265 | 2/1961 | France | 74/801 |
| 1366089 | 6/1964 | France | |
| 56-164250 | 12/1981 | Japan | 74/801 |
| 56-164252 | 12/1981 | Japan | 74/801 |
| 234986 | 6/1925 | United Kingdom | 74/801 |

OTHER PUBLICATIONS

Masataka Senba: Gear, vol. 10, Nikkan Kogyo, No. 1967, p. 3989.

Muneharu Morozumi: Design of Planetary Gears and Differential Planetary Gears, Sankei, Jun. 1, 1984, p. 124.

Takashi Nakada: Collected Papers of Takashi Nakada, Nov. 25, 1984, p. 192.

Primary Examiner—Dwight G. Diehl
Attorney, Agent, or Firm—Oblon, Spivak, McClelland, Maier & Neustadt

[57] ABSTRACT

In a planetary gear apparatus according to the present invention, a first shaft and a second shaft are rotatably supported in a casing. A sun gear is fixed to the first shaft. A fixed internal gear located in the casing is arranged concentric with the sun gear. A rotary internal gear connected to the second shaft is arranged coaxially with the fixed internal gear, and the rotary internal gear has the difference M in the number of teeth with respect to the number of the teeth of the fixed internal gear. N ($M \neq N$, $N \neq 1$) planet gears, which revolve around the sun gear, are disposed at equal intervals circumferentially. Each planet gear has a first portion, engaged with the fixed internal gear, and a second portion, engaged with the rotary internal gear. Either one of the first and second portions of the planet gear is engaged with the sun gear. When the number of planet gears is designated circumferentially by $i = 1, 2, \ldots, N$, the phase of the teeth of the first portion of the i-th planet gear is shifted in the period of $\{(i-1)M\}/N$ with respect to that of the teeth of the second portion.

16 Claims, 5 Drawing Sheets

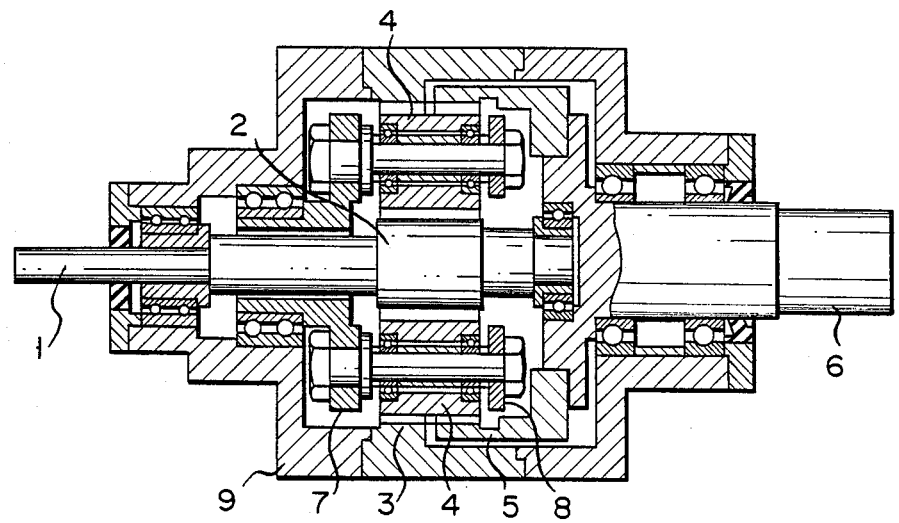
F I G. 1
PRIOR ART
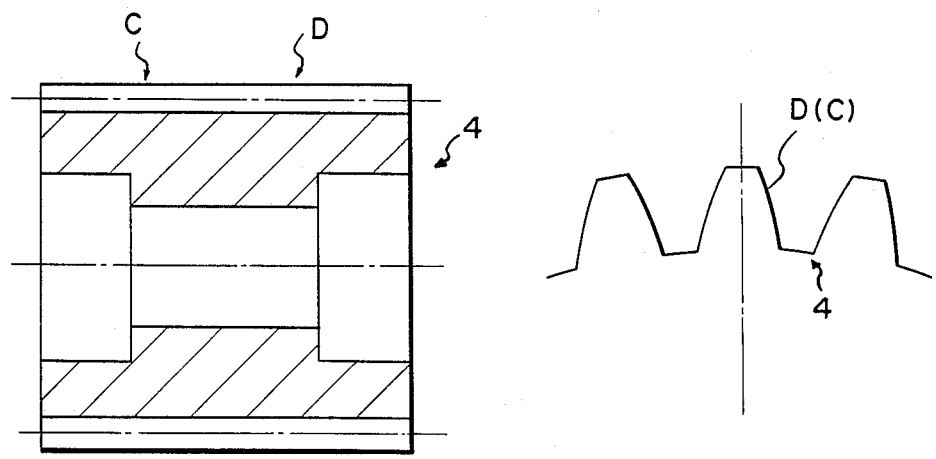
F I G. 2A
PRIOR ART
F I G. 2B
PRIOR ART

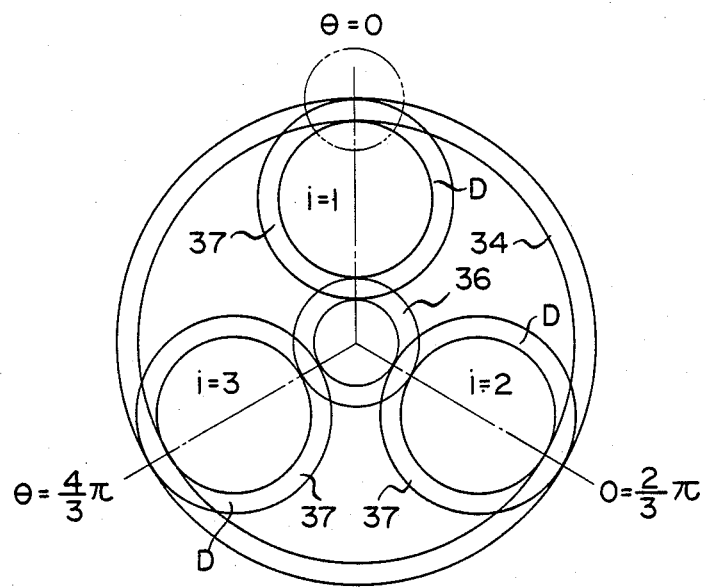
F I G. 4A
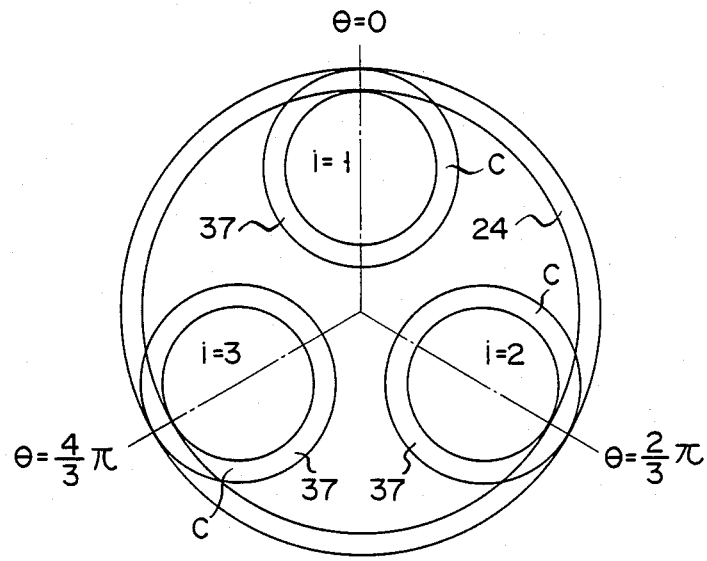
F I G. 4B

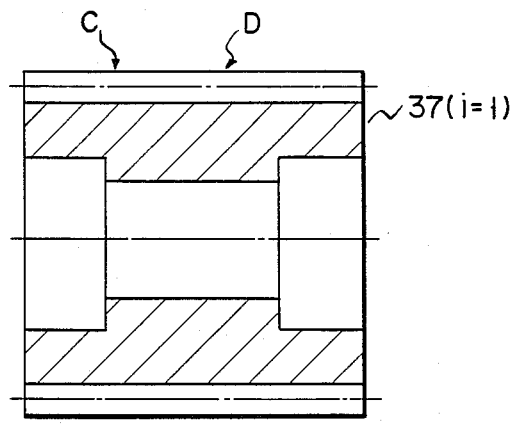
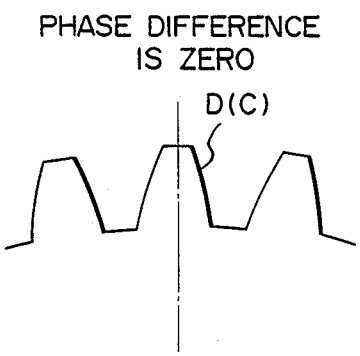
F I G. 5A　　　　F I G. 5B
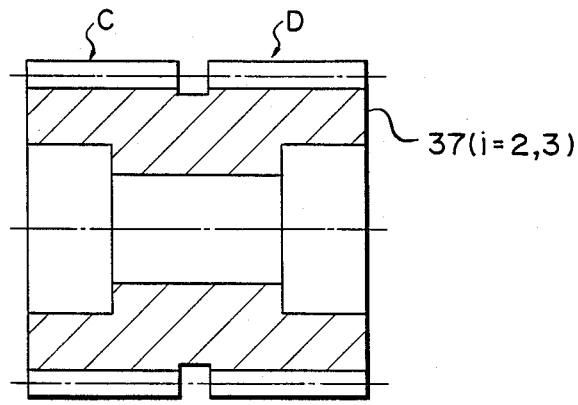
F I G. 6A
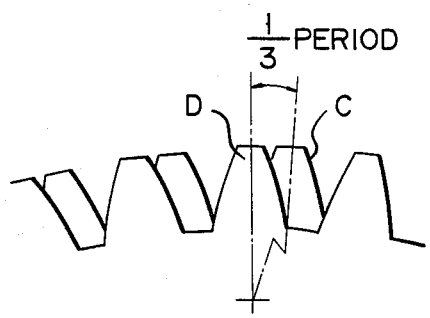
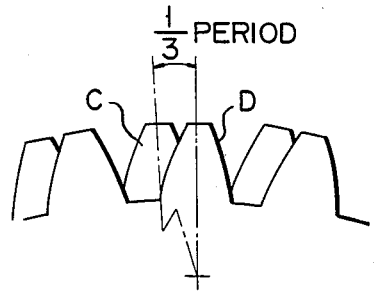
F I G. 6B　　　　F I G. 6C 4,864,893

PLANETARY GEAR HAVING ITS ORBITAL GEARS OUT OF PHASE

FIELD OF THE INVENTION

The present invention relates to a planetary gear aparatus and, more particularly, to a planetary gear apparatus adapted, for example, for a reduction gear device which is part of a joint driving mechanism of a robot arm.

BACKGROUND OF THE INVENTION

A multijoint arm type robot is provided with an arm which includes a plurality of arm units and a plurality of joints for rotatably connecting the distal end of one arm unit to the proximal end of another arm unit. Each arm unit is provided with actuators at the distal end and the proximal end. Each actuator has a motor and a reduction gear device. When the motor is driven, the arm unit rotates around the joint acting as a center of rotation. Since the arm unit requires a high torque in order for it to rotate, the reduction gears are therefore required to have a high reduction ratio. Since the weight of arm units situated at the distal end of an arm exerts a considerable load on the actuators of arm units situated at the proximal end, therefore, the robot should be built small in size and light in weight, as should also the reduction gear device. When the arm is stationary, it must be accurately positioned so as not to move even slightly. Accordingly, the reduction gear device should have high torsional rigidity and high power transmission characteristics.

As the above-described reduction gear device, a differential planetary gear apparatus shown in FIG. 1 has therefore been employed. The apparatus has an input shaft 1 and an output shaft 6. A sun gear 2 is fixed to the input shaft 1. A plurality of planet gears 4 are disposed at equal interval circumferentially around the sun gear 2. The planet gears 4 engage with a fixed internal gear 3 and a rotary internal gear 5. The rotary internal gear 5 is coupled with the output shaft 6.

When the input shaft 1 is rotated, the sun gear 2 is rotated and each of the planet gears 4 revolves around the sun gear 2 while revolving around its own axis. Thus, the rotary internal gear 5 is rotated by the angle determined by the difference in the number of the teeth of the rotary and fixed internal gears 5 and 3. As a result, the output shaft 6 is rotated at a reduced rotational frequency with respect to that of the input shaft 1.

As has already been stated above, the planet gears 4 are disposed at equal intervals in a revolving orbit around the sun gear 2. Therefore, the loads exerted by the internal gears 3 and 5 are uniformly distributed among the planet gears 4, to improve the power transmission characteristics and torsional rigidity. Each planet gear 4 comprises a portion C engaged with the fixed internal gear 3 and a portion D engaged with the rotary internal gear 5, as is shown in FIGS. 2A and 2B. Portions C and D have no phase difference. These portions are formed integrally. Further, either or both of the internal gears 3 and 5 is profile-shifted so that the diameters of the addendum circles of the gears 3 and 5 are the same size.

The reduction gear ratio R of the differential planetary gear apparatus is obtained by the following equation, in the case of $Z_C < X_D$ where $Z_A$, $Z_C$, and $Z_D$ represent, respectively, the number of the teeth of the sun gear 2, of the fixed internal gear 3, and of the rotary internal gear 5.

$$R = \{1 + (Z_C/Z_A)\}/\{1 - (Z_C/Z_D)\} \tag{1}$$

As is apparent from equation (1), a large reduction gear ratio can theoretically be freely set. For example, when the difference $M = |Z_D - Z_C|$ in number of the teeth between both internal gears is reduced, the reduction gear ratio increases. When the difference M of the numbers of the teeth is increased, the reduction gear ratio decreases.

However, in order to dispose planet gears at an equal interval circumferentially around the sun gear, it is necessary to satisfy "the assembling conditions", in which the phases of teeth of the respective planet gears coincide with those of spaces of the gears engaged with the planet gears. More specifically, N planet gears are disposed at equal intervals circumferentially by being divided equally at $2\pi/N$. To this end, it is necessary that the number of the teeth of the gears engaged with the planet gears should be exactly divisible by N. Therefore, when the numbers $Z_A$, $Z_C$, $Z_D$ of the teeth of the respective gears are selected, $Z_A$, $Z_C$, and $Z_D$ must be set to the integral multiple of number N of the planet gears arranged at equal intervals. For example, when the difference M in the numbers of teeth is $M = 1$, the number N of the planet gears becomes $N = 1$. However, when $N = 3$ is selected in the case of $M = 1$, the phase of the teeth of one planet gear coincides with the phase of the spaces of the internal gears, but the phases of the teeth of the remaining two planet gears do not coincide with that of the spaces of the internal gears. Thus, since the number N is not freely set, a desired reduction gear ratio may not always be obtainable, as will be described.

For example, when the value of the difference $M = |Z_D - Z_C|$ of the teeth of the gears is 1 or 2, the number N of the planet gears is small, i.e., 1 or 2. Thus, the loads exerted by the fixed and rotary internal gears are unevenly distributed among the small number of planet gears, thereby causing a reduction in the torsional rigidity. Thus, the case wherein $N = 1$ cannot always be realized. On the other hand, when difference M of the teeth of the gears is 4 or 5, number N is relatively great, i.e., 4 or 5. Thus, there arises the drawback wherein the planet gears cannot be accommodated on the revolving orbit around the sun gear or they interfere with each other.

Therefore, the number N of the planet gears $N = 3$ is most preferable. In this case, the difference M in number of the teeth between the gears cannot be other than a multiple of 3, according to the assembling conditions. As has been explained above, since the conventional differential planetary gear apparatus is restricted as to the selection of the number (i.e., the equal interval distribution number N) of the planet gears, the selections of the numbers of the teeth of the gears are limited, with the result that a variety of reduction gear ratios cannot be provided.

It is, therefore, desired that N be 3, and a variety of reduction ratios (or speed ratios) be provided. The condition desired in practice is that $M = 1$ and $N = 3$. This condition cannot be satisfied by the conventional differential planetary gear apparatus.

OBJECT OF THE INVENTION

It is an object of the present invention to provide a differential planetary gear apparatus whereby a variety of reduction gear ratios can be obtained without decreasing the power transmission characteristics and torsional rigidity, irrespective of the number of planet gears.

In other words, it is an object of the present invention to provide a differential planetary gear apparatus which can provide a variety of speed ratios under the condition that the number of planet gears is ideal.

SUMMARY OF THE INVENTION

In a differential planetary gear apparatus according to the present invention, a first shaft and a second shaft are rotatably supported by a casing. A sun gear is fixed to the first shaft. A fixed internal gear provided in the casing is concentrically disposed with the sun gear. A rotary internal gear connected to the second shaft is coaxially disposed with the fixed internal gear and has a difference M in number of the teeth with respect to the number of the teeth of the fixed internal gear. N ($M \neq N$, $N \neq 1$) planet gears, each of which revolves around the sun gear while revolving around its own axis, are disposed at equal intervals circumferentially. Each planet gear has a first portion engaged with the fixed internal gear and a second portion engaged with the rotary internal gear. Either one of the first and second portions of the planet gear is engaged with the sun gear. When the number of the planet gears is designated circumferentially by $i = 1, 2, \ldots, N$, the phase of the teeth of the first portion of the i-th planet gear is shifted in period of $\{(i-1)M\}/N$ with respect to the phase of the teeth of second portion.

When the first shaft is rotated, the sun gear is revolved. When the sun gear is engaged with the second portion of a planet gear, the planet gear revolves around the sun gear while revolvong around its own axis as the sun gear rotates. When the planet gears move, the rotary internal gear rotates by the angle determined by the difference of the teeth of the fixed and rotary internal gears. The second shaft is rotated by the rotation of the rotary internal gear. The reduction gear ratio can be obtained by the equation (1) similarly to the conventional apparatus.

In the conventional apparatus, if $N = 3$ and $M = 1$, for example, one internal gear satisfies the assembling condition, but the other internal gear could not satisfy the assembling condition. This is because, in case of $N = 3$ and $M = 1$, the phase of the teeth of the planet gear does not coincide with that of the spaces of the other internal gear.

On the other hand, the phase of the teeth of the first portion of the planet gear is shifted in a predetermined period with respect to that of the teeth of the second portion of the planet gear. Thus, when the second portion of the planet gear and the rotary internal gear satisfy the assembling condition, the phase of the teeth of the first portion of the planet gear can coincide with the phase of the spaces of the fixed internal gear. Of course, even when the first portion of the planet gear and the fixed internal gear satisfy the assembling condition, the phase of the second portion of the planet gear can coincide with the phase of the rotary internal gear. Also, the phase of the spaces of the first portions may be shifted in a predetermined period, so that the phase of the spaces of the first portion can coincide with the phase of the teeth of the fixed internal gear.

Therefore, if at least one of the fixed and rotary internal gears satisfies the assembling condition, the number of the teeth of the other internal gear can be freely selected irrespective of the number of the planet gears. In other words, the number of the teeth of the gear and the reduction gear ratio or speed ratio can be freely selected irrespective of the number of the planet gears. Consequently, various speed ratios can be obtained without decreasing the power transmission characteristic and the torsional rigidity of the differential planet gear apparatus.

Further, as described above, the number N of the planet gears is preferably 3. In the present invention, the difference M of the numbers of the teeth of the gears can be set to $M = 1$, while $N = 3$ is selected. More particularly, a variety of speed ratios can be provided while the number of the planet gears is ideal.

BRIEF DESCRIPTION OF THE DRAWINGS

FIG. 1 is a sectional view of a differential planetary gear apparatus according to prior art;

FIG. 2A is a sectional view of a planet gear used in the apparatus in FIG. 1;

FIG. 2B is a view showing the teeth of the planet gear in FIG. 2;

FIG. 4A is a view showing the engaging state of a rotary internal gear with planet gears;

FIG. 4B is a view showing the engaging state of a fixed internal gear with planet gears;

FIG. 5A is a sectional view of the planet gear of $i = 0$;

FIG. 5B is a view showing that the phase difference of the teeth of the planet gear of $i = 0$ is 0;

FIG. 6A is a sectional view of planet gears of $i = 2, 3$;

FIG. 6B is a view showing that the phase difference of the teeth of the planet gear of $i = 2$;

FIG. 6C is a view showing that the phase difference of the teeth of the planet gear of $i = 3$.

DETAILED DESCRIPTION OF THE PRFERRED EMBODIMENTS

Figure 3:
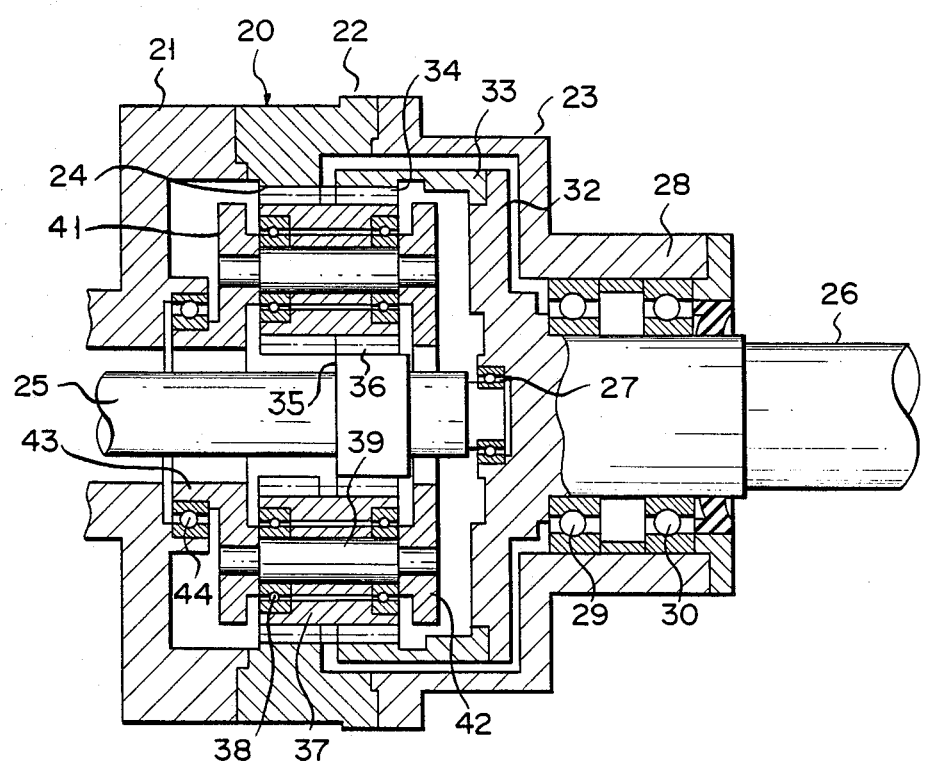
FIG. 3 is a sectional view of a differential planetary gear apparatus of a embodiment according to the present invention.

FIG. 3 shows a differential planetary gear apparatus according to an embodiment of the present invention. This apparatus comprises a casing 20. The casing 20 comprises a first casing 21, a second casing 22, and a third casing 23. A fixed internal gear or fixed ring gear 24 is formed on the inner peripheral surface of the second casing 22.

A first shaft or input shaft 25 is inserted into the first casing 21. A second shaft or output shaft 26 is inserted into the third casing 23. The shafts 25, 26 are coaxial with each other, and they are disposed concentrically with the fixed internal gear 24. The left end of shaft 25 is rotatably supported by a ball bearing (not shown) provided in the first casing 21. The right end of the input shaft 25 is rotatably supported by a ball bearing 27 provided at the left end of the output shaft 26. Ball bearings 29 and 30 are provided in a peripheral wall 28 formed at the right end of the third casing 23.

The output shaft 26 is rotatably supported by the bearings 29, 30.

A disc-like flange 32 is formed at the left end of the output shaft 26. A cylindrical member 33 is provided on the flange 32, along the inner peripheral surface of the casing 20. A rotary internal gear or rotary ring gear 34 is formed on the inner peripheral surface of the cylindrical member 33.

The rotary internal gear 34 is disposed coaxially with the fixed internal gear 24, but the number of the teeth of the rotary internal gear 34 is slightly different from that of fixed internal gear 24. The teeth of the fixed internal gear 24 are profile-shifted. However, the diameters of the addendum circles of the fixed and rotary internal gears 24 and 34 are the same.

A portion 35 of the input shaft 25 disposed radially inwardly of the rotary internal gear 34 is formed in a large diameter. A sun gear 36 is formed on the large-diameter portion 35 of the input shaft 25. Three planet gears 37 engaged with the sun gear 36, the fixed internal gear 24, and the rotary internal gear 34 are disposed at equal intervals circumferentially around the sun gear 36. Each planet gears 37 is rotatably supported by ball bearings 38 provided on shafts a corresponding shaft 39. The three shafts 39 are fixed to annular carriers 41, 42 disposed at the two sides of the planet gears. The annular carriers 41, 42 are coupled by a block (not shown) to eliminate relative displacements of the annular carriers 41, 42. The three planet gears 37 are held at an equal interval circumferentially by the annular carriers 41, 42. A peripheral wall 43 is formed on the annular carrier 41 to cover the input shaft 25. The peripheral wall 43 is rotatably supported by ball bearing 44 provided in the first casing 21. Thus, the annular carriers 41, 42 are rotatably constructed.

The gears of this embodiment will be described in detail.

FIG. 4A shows the state that the rotary internal gear 34, the planet gears 37, and the sun gear 36 are engaged. In this embodiment, the number N of planet gears 37 is N=3, and, as shown in FIG. 4A, the gear number i of the planet gears is designated clockwise by i=1, 2, 3. The planet gears i=1, 2, 3 are disposed at the positions corresponding to $\theta=0$, $\theta=(2\pi)/3$, and $\theta=(4\lambda)/3$, respectively.

In this embodiment, the number of the teeth of the rotary internal gear 34 is 108, and the number of teeth of the sun gear 36 is 12. These numbers of the teeth of multiples gears are all of the integer number of N, so that these numbers satisfy the above-mentioned assembling condition.

As shown in FIG. 4B, the relationship between the fixed internal gear 24 and the planet gears 37 will be described in detail. In this embodiment, the number of the teeth of the rotary internal gear 34 is more than that of the fixed internal gear 24. In other words, in order to set the difference M in number of the teeth between both internal gears 24 and 34 to M=1, the number of the teeth of the fixed internal gear 24 is set to 107. In this case, as described above, the planet gears i=1, 2, 3 are disposed at the positions corresponding to $\theta=0$, $\theta=(2\pi)/3$, $\theta=(4\pi)/3$, respectively. IN the conventional technique, in case of M=1, when the three planet gears are disposed at the respective positions, only the planet gear (i=1) satisfies the assembling condition. However, the planet gears (i=2, i=3) do not satisfy the assembling condition because the phases of the teeth of the planet gears do not coincide with the phases of the spaces of the fixed internal gear 24.

However, in this embodiment, as shown in FIGS. 6A, 6B and 6C, each of the planet gears (i=1 to i=3) comprises a portion C engaged with the fixed internal gear 24 and a portion D engaged with the rotary internal gear 34. The phase of the teeth of the portions C is shifted in the period of $\{(i-1)M\}/N$ with respect to that of the portions D. Thus, the phases of the teeth of the portions C of the planet gears (i=2, i=3) coincide with the phases of the spaces of the fixed internal gear 24. In other words, the portions C of the planet gears (i=2, i=3) can be engaged with the fixed internal gear 24 while being disposed at an equal interval circumferentially.

More particularly, as shown in FIGS. 5A and 5B, the phase of the teeth of the portion C engaged with the fixed internal gear 24 of the planet gear (i=1) coincides with that of the teeth of the portion D engaged with the rotary internal gear 34. As shown in FIGS. 6A, 6B, and 6C, the portion C of the planet gear (i=2) conicides with the portion D in the diameter of the addendum circle, the number of the teeth and the toothform. However, the phase of the teeth of the portion C of the planet gear (i=2) leads to the period of $\{(i-1)M\}/N=\frac{1}{3}$ with respect to that of the portion D. The portion C of the planet gear (i=3) coincides with the portion D in the diameter of the addendum circle, the number of the teeth and the tooth-form, similarly to the planet gear (i=2). However, the phase of the teeth of the portion C of the planet gear (i=3) leads in the period of $\{(i-1)M\#/N=\frac{2}{3}$ with respect to that of portion D. In other words, the phase of the teeth of the portion C lags in the period of $\frac{1}{3}$ with respect to that of the portion D.

Therefore, when the portions D of the planet gears 37 and the rotary internal gear 34 satisfy the assembling condition, the phase of the spaces of the fixed internal gear 24 coincide with that of the portion C of the planet gears 37 so that the fixed internal gear 24 is engaged with the portions C of the planet gear 37. Thus, if at least one of the fixed and rotary internal gears 24, 34 satisfies the assembling condition, the number of the teeth of the other gear can be freely selected, irrespective of the number of the planet gears 37. Therefore, a variety of speed ratios can be obtained without decreasing the power transmission characteristic and the torsional rigidity of the differential planetary gear apparatus.

Even in case of M=2, 4, the phase of the teeth of the portions C of the planet gears 37 (i=1, 2, 3) may be shifted in the pierod of $\{(i-1)M\}/N$ with respect to that of the portions of the planet gears 37. The relationship between the difference M in number of the teeth of the gears and the phase difference of the teeth of the planet gears (i=1, 2, 3) is indicated in Table 1.

TABLE 1

| Gear No. i | Difference M of number of teeth | | | |
|---|---|---|---|---|
| | 1 | 2 | 3 | 4 |
| 1 | 0 | 0 | 0 | 0 |
| 2 | $\frac{1}{3}$ | $-\frac{1}{3}$ | 0 | $\frac{1}{3}$ |
| | ($\frac{1}{3}$) | ($\frac{2}{3}$) | (3/3) | (4/3) |
| 3 | $-\frac{1}{3}$ | $\frac{1}{3}$ | 0 | $-\frac{1}{3}$ |
| | ($\frac{2}{3}$) | (4/3) | (6/3) | (8/3) |

In Table 1, "0" represents no phase difference, a positive value means a phase lead, and a negative value means a phase lag. As is apparent from Table 1, there are two types of phase differences of $\frac{1}{3}$ and $-\frac{1}{3}$. When the difference of the numbers of the teeth is modified from M=1 to M=2, the position of the planet gear having the phase difference of $\frac{1}{3}$ may be replaced by the position of the planet gear having the phase difference of $-\frac{1}{3}$.

As shown in FIG. 6A, a planet gear 37 having the phase difference is formed outside the rim to increase its torsional ridity. The portions C and D of the planet gear may be integrally formed, or they may be separately formed. When the portions C, D are separately formed, the portions C, D may be coupled by welding, or they may be coupled by a pin. However, when the portions C, D are separately formed, the accuracy might be deteriorated. Therefore, it is preferable that the portions C, D are integrally formed. The sun gear 36 is engaged only with the portion D having no phase difference from the planet gear 37. Thus, the sun gear 36 is formed relatively shorter in the width of teeth of the sun gear 36 so as not to interfere with the portion C of planet gear 37.

When rotary driving power from a motor, not shown, is transmitted to the input shaft 25, the sun gear 36 is rotated. The planet gears 37 are revolved around the sun gear 36 by the rotation of the sun gear 36 while revolving around their own axes. Thus, when the planet gears 37 move, the rotary internal gear 34 rotates by an angle determined by the difference in the numbers of the teeth of the fixed and rotary internal gears 24 and 34. The rotary force of the rotary internal gear 34 is transmitted through the cylindical member 33 and the flange 32 to the output shaft 26.

In the apparatus according to the present invention, as described above, the difference of the teeth of the gears and the speed ratio can be set to predetermined values irrespective of the number of the planet gears. Therefore, high and low reduction gear ratios can be freely provided.

As described above, from the point that it is necessary to exert the loads of the internal gears uniformly to the planet gears, the number N of the planet gears is most preferably 3. According to the present invention, the case of the difference of the teeth of the gear $M=1$ can be performed while the number N of the planet gears is set to $N=3$. In other words, a variety of speed ratios may be provided while the number of the planet gears is ideal. Thus, the loads of the internal gears can be uniformly distributed among the planet gears, and various speed ratios can be provided without decreasing the power transmission characteristic and the torsional rigidity.

When the difference M in number of the teeth of the gears is modified from $M=1$ to $M=2$, the positions of the two planets gears having different phase differences may be alternately replaced. Therefore, when various speed ratios are achieved, the number of parts may be reduced.

Since the teeth having phase difference are formed on the outer periphery of the rim formed integrally, the torsional rigidity of the planet gears can be enhanced.

A reduction gear of a differential planetary gear apparatus according to the present invention was trially manufactured, and the relationship between the difference of the teeth of the gears and the speed ratios and the experimental efficiency were observed by the reduction gear.

The specifications of the reduction gear were speed ratios of 1000, 500, and 250; output torque of 700 N-m; profile of 200 mm or less; and weight of 10 kg. or less.

DIMENSIONS OF THE GEARS

The gears were involute spur gears (parallel gears), in which the module m was 1.25, the pressure angle of the tool was 20°, and the top clearance was 0.25 m. The dimensions are indicated in Table 2. The number N of the planet gears was $N=3$. The planet gears were formed in such a manner that the phase of the teeth of portion C of planet gear ($i=2$) was shifted in the period of $\frac{1}{3}$ and the phase of the teeth of portion C of planet gear ($i=3$) was shifted in the period of $-\frac{1}{3}$. When the difference of the teeth of the gears is variously modified, the positions of a plurality of planet gears having different phase difference may be replaced from each other. To this end, in this experiments, when the difference of the teeth of the gears were variously modified, the position of the planet gear having phase difference of $\frac{1}{3}$ was replaced with that of the planet gear having phase difference of $-\frac{1}{3}$.

TABLE 2

| | | Items | | |
|---|---|---|---|---|
| Gears | | Number of teeth | Diameter of addendum circle (mm) | Distances of centers (mm) |
| Sun gear A | | 12 | 18.345 | |
| Planet gear B | | 47 | 61.900 | |
| Fixed internal gear C | C1 | 107 | | 37.702 |
| | C2 | 106 | | |
| | C3 | 105 | 132.463 | |
| | C4 | 104 | | |
| Rotary internal gear D | | 108 | | |

SPEED RATIO

Figure 7:
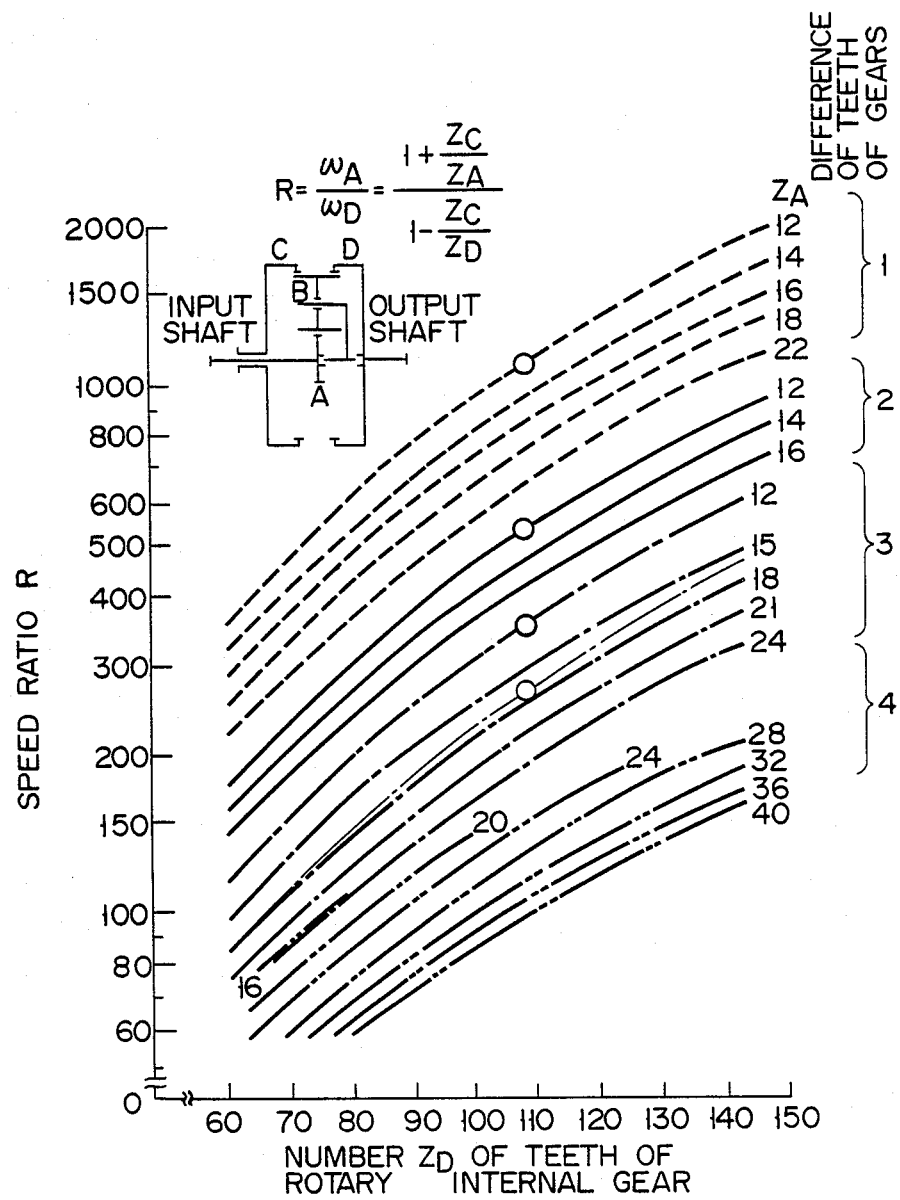
FIG. 7 is a view showing the relationship between the number of the teeth of the rotary internal gear and the speed ratio.

The equation (1) of the conventional apparatus may be directly applied to the calculation of the speed ratio. With the difference in number of the teeth between the two internal gears $M=Z_D-Z_C$ and the number $Z_A$ of the sun gear as parameters, the result of the calculation of the speed ratio R is shown in FIG. 7. In FIG. 7, broken lines designate the case of $M=1$, solid lines designate the speed ratio R in the case of $M=2$, dotted chain lines designate the case of $M=3$, and two-dotted chain lines designate the case of $M=4$. The speed ratios obtained by the experiments were $R=1071$, 531, 351, 261, which were plotted in FIG. 7. In case of $M=1$, in the conventional apparatus, the engagement of the gears were unbalanced, and the case of $M=1$ has not been realized. However, according to the present invention, since the difference in number of the teeth between the gears and the speed ratios can be set to predetermined values irrespective of the number of the planet gears, the case of $M=1$ can be readily performed. Consequently, as is apparent in FIG. 7, much higher and lower reduction gear ratios than the conventional one can be performed.

EFFICIENCY OF EXPERIMENTS

The efficiencies of the experiments in case of three types of reduction gear ratios $R=261$, 531 and 1071 were obtained. The efficiencies exhibited the maximum values $\eta 261=72.1\%$, $\eta 53=62.0\%$, and $\eta 1071=47.4\%$ with 400 N-m of output torque. Further, the efficiencies exhibited $\eta 261=70.1\%$, $\eta 53=62.0\%$, and $\eta 1071=44.7\%$ with 700 N-m of rated output torque. The maximum values of the experimental efficiencies were lower by approx. 6 to 8% as compared with the theoretical engaging efficiency, in case the mean frictional coefficient between the teeth surfaces of the gears is set to 0.08.

The present invention is not limited to the particular embodiments described above. For example, the equal interval distribution number N of the planet gears is not limited to N=3, but may be N=2, 4, 5, 6, . . . . The difference M in number of the teeth between the fixed and rotary internal gears is not limited to M=1, 2, 4, but may be M=3, 5, 6. In other words, arbitrary combination of M and N may be set except the case of M=N. The present invention may be also applied to the case that the number of the teeth of the fixed internal gear is more than that of the rotary internal gear.

In the embodiments described above, the differential planetary gear apparatus has been used as a reduction gear device. However, the apparatus of the present invention may be also applied to an accelerator. In this case, the first shaft is an output shaft, and the second shaft is an input shaft.

What is claimed is:

1. A planetary gear apparatus comprising:
   (a) a casing;
   (b) a first shaft rotatably supported by said casing;
   (c) a second shaft rotatably supported by said casing;
   (d) a sun gear fixed to said first shaft;
   (e) a fixed internal gear:
      (i) arranged concentrically with said sun gear and
      (ii) located in said casing;
   (f) a rotary internal gear:
      (i) arranged coaxially with said fixed internal gear,
      (ii) having a difference M in number of teeth with respect to the number of teeth of said fixed internal gear,
      (iii) coupled to said second shaft, and
      (iv) having an addendum circle the diameter of which is the same as the diameter of the addendum circle of said fixed internal gear; and
   (g) N (M≠N, N≠1) planet gears:
      (i) each of which revolves around said sun gear while revolving around its own axis,
      (ii) disposed at equal intervals circumferentially around said sun gear,
      (iii) each having a first gear portion meshed with said fixed internal gear and a second gear portion meshed with said rotary internal gear, the first gear portion of each one of said planet gears having the same number of teeth and the same addendum circle diameter as the second gear portion,
      (iv) either one of the first and second gear portions of said planet gears being meshed with said sun gear, and
      (v) when the number of said planet gears is designated by i=1, 2, . . . , N circumferentially, the phase of the teeth of the first gear portion of the i-th planet gear being shifted in the period of $\{(i-1)M\}/N$ with respect to that of the teeth of the second gear portion.

2. A planetary gear apparatus according to claim 1, wherein:
   (a) the number of the teeth of said sun gear is an integral multiple of N;
   (b) the number of the teeth of said rotary internal gear is an integral multiple of N; and
   (c) said sun gear is meshed with the second portions of said planet gears meshed with said rotary internal gear.

3. A planetary gear apparatus according to claim 1, wherein the first portions of all of said planet gears have the same addendium circle diameters.

4. A planetary gear apparatus according to claim 1, wherein the first portions of all of said planet gears have teeth of the same form.

5. A planetary gear apparatus according to claim 1, wherein the first portions of all of said planet gears have an equal number of teeth.

6. A planetary gear apparatus according to claim 1, and further comprising a carrier for holding said planet gears at equal intervals along the circumference of said rotary internal gear, said carrier rotating around said first shaft when said planet gears revolve around said sun gear.

7. A planetary gear apparatus according to claim 1, wherein said first shaft and said second shaft are arranged coaxially.

8. A planetary gear apparatus according to claim 1, wherein:
   (a) the difference M in number of the teeth between said internal gears is M=1 and
   (b) the number N of said planet gears is N=3.

9. A planetary gear apparatus comprising:
   (a) a casing;
   (b) a first shaft rotatably supported by said casing;
   (c) a second shaft rotatably supported by said casing;
   (d) a sun gear fixed to said first shaft;
   (e) a fixed internal gear:
      (i) arranged concentrically with said sun gear and
      (ii) located in said casing;
   (f) a rotary internal gear:
      (i) arranged coaxially with said fixed internal gear,
      (ii) having a difference M in number of teeth with respect to the number of teeth of said fixed internal gear,
      (iii) coupled to said second shaft, and
      (iv) having an addendum circle the diameter of which is the same as the diameter of the addendum circle of said fixed internal gear; and
   (g) N (M≠N, N≧3) planet gears:
      (i) each of which revolves around said sun gear while revolving around its own axis,
      (ii) disposed at equal intervals circumferentially around said sun gear,
      (iii) each having a first gear portion meshed with said fixed internal gear and a second gear portion meshed with said rotary internal gear, the first gear portion of each one of said planet gears having the same number of teeth and the same addendum circle diameter as the second gear portion,
      (iv) either one of the first and second gear portions of said planet gears being meshed with said sun gear, and
      (v) when the number of said planet gears is designed by i=3, 4, . . . , N circumferentially, the phase of the teeth of the first gear portion of the i-th planet gear being shifted in the period of $\{(i-1)M\}/N$ with respect to that of the teeth of the second gear portion.

10. A planetary gear apparatus according to claim 9, wherein:
    (a) the number of the teeth of said sun gear is an integral multiple of N;
    (b) the number of the teeth of said rotary internal gear is an integral multiple of N; and
    (c) said sun gear is meshed with the second portion of said planet gears meshed with said rotary internal gear.

11. A planetary gear apparatus according to claim 9, wherein the first portions of all of said planet gears have the same addendum circle diameters.

12. A planetary gear apparatus according to claim 9, wherein the first portions of all of said planet gears have teeth of the same form.

13. A planetary gear apparatus according to claim 9, wherein the first portions of all of said planet gears have an equal number of teeth.

14. A planetary gear apparatus according to claim 9, and further comprising a carrier for holding said planet gears at equal intervals along the circumference of said rotary internal gear, said carrier rotating around said first shaft when said planet gears revolve around said sun gear.

15. A planetary gear apparatus according to claim 9, wherein said first shaft and said second shaft are arranged coaxially.

16. A planetary gear apparatus according to claim 9, wherein:
(a) the difference M in number of the teeth between said internal gears is $M=1$ and
(b) the number N of said planet gears is $N=3$.

* * * * *